United States Patent
Meadows et al.

(10) Patent No.: US 7,926,065 B2
(45) Date of Patent: Apr. 12, 2011

(54) METHOD AND SYSTEM FOR DYNAMICALLY SPECIFYING A FORMAT FOR DATA PROVIDED BY A WEB SERVICE INVOCATION

(75) Inventors: Chad Lee Meadows, Raleigh, NC (US); Han T. Nguyen, Apex, NC (US); Paul Thomas Sorenson, Sheboygan, WI (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 11/557,160

(22) Filed: Nov. 7, 2006

(65) Prior Publication Data

US 2008/0109524 A1    May 8, 2008

(51) Int. Cl.
*G06F 3/00* (2006.01)
*G06F 17/00* (2006.01)
*G06F 13/12* (2006.01)
*G06F 9/44* (2006.01)

(52) U.S. Cl. .......... 719/313; 715/239; 715/249; 710/65; 717/115

(58) Field of Classification Search .................. None
See application file for complete search history.

(56) References Cited

U.S. PATENT DOCUMENTS

| | | | |
|---|---|---|---|
| 2001/0056504 A1 * | 12/2001 | Kuznetsov | .................... 709/310 |
| 2003/0172110 A1 | 9/2003 | Kunisetty | |
| 2003/0200349 A1 | 10/2003 | Hansen | |
| 2003/0217044 A1 | 11/2003 | Zhang et al. | |
| 2004/0148328 A1 | 7/2004 | Matsushima | |
| 2004/0220952 A1 | 11/2004 | Cheenath | |
| 2004/0243682 A1 | 12/2004 | Markki et al. | |
| 2005/0050228 A1 | 3/2005 | Perham et al. | |
| 2005/0050549 A1 | 3/2005 | Joseph et al. | |
| 2005/0097178 A1 | 5/2005 | Bala | |
| 2005/0114670 A1 | 5/2005 | Bowe et al. | |
| 2005/0138210 A1 | 6/2005 | Shkvarchuk et al. | |
| 2005/0144557 A1 | 6/2005 | Li et al. | |
| 2005/0228693 A1 | 10/2005 | Webb et al. | |
| 2006/0031763 A1 * | 2/2006 | Yeung | ........................... 715/523 |
| 2006/0122982 A1 | 6/2006 | Krishnaprasad et al. | |
| 2006/0150026 A1 | 7/2006 | Kolawa et al. | |
| 2007/0038930 A1 * | 2/2007 | Derrick et al. | ................. 715/523 |

FOREIGN PATENT DOCUMENTS

WO      02073466 A1      9/2002

OTHER PUBLICATIONS

PCT International Search Report.
Ying, et al.; A Performance Evaluation of Using SOAP with Attachments for e-Science; 8 pages.

* cited by examiner

*Primary Examiner* — Lechi Truong
*Assistant Examiner* — Tuan Dao
(74) *Attorney, Agent, or Firm* — Schmeiser, Olsen & Watts; John R. Pivnichny (57) ABSTRACT

A method and system for dynamically specifying a format for data provided by a web service invocation. A server providing a web service receives a client request for data residing on the server. The server receives an executable template script within the request. The template script includes an instruction for invoking a function residing in the server and a definition specifying a format to structure the requested data. The server executes the template script to perform the instruction, invoke the function to retrieve the data, and generate formatted data based on the definition. The formatted data is the retrieved data structured in the format specified by the definition. The server sends the formatted data to the client.

23 Claims, 3 Drawing Sheets

METHOD AND SYSTEM FOR DYNAMICALLY SPECIFYING A FORMAT FOR DATA PROVIDED BY A WEB SERVICE INVOCATION

FIELD OF THE INVENTION

The present invention relates to dynamically specifying a format for data provided by a web service invocation.

BACKGROUND OF THE INVENTION

In some conventional communications between a client and a web service, each client request for a specific portion of data requires a separate, pre-defined function to be executed by the web service that receives the request. This need for many pre-defined functions on the server side requires a significant amount of coding, development and maintenance efforts. When initial development efforts on the server side do not anticipate all possible types of client data requests, additional development efforts are necessary to generate necessary functions. In other conventional client-web service communications, the server returns all data in response to a client request, regardless of what portion of data the client needs. This scheme places a burden on the client side to parse through the data to find the needed portion. Further, when the amount of data returned by the server is large, this scheme is hindered by slow transaction times. Thus, there exists a need to overcome at least one of the preceding deficiencies and limitations of the related art.

SUMMARY OF THE INVENTION

The present invention provides a method of dynamically specifying a format for data provided by a web service invocation in a networked computing environment, comprising:

receiving, by a first computing unit via a network, a request from a second computing unit for a first data item residing on the first computing unit, the first computing unit providing a web service, the request being an invocation of the web service, receiving, by the first computing unit and within the request, an executable template script that includes an instruction for invoking a function residing in the first computing unit and a definition specifying a first format to structure the first data item;

executing, by the first computing unit, the executable template script, the executing comprising: performing the instruction, invoking the function via the performing, retrieving the first data item in response to the invoking, and generating a formatted data item based on the definition, the formatted data item being the first data item structured in the first format; and sending, by the first computing unit, the formatted data item to the second computing unit.

A system, computer program product, and process for supporting computing infrastructure corresponding to the above-summarized method are also described and claimed herein.

Advantageously, the present invention provides an efficient, flexible, and dynamic scheme for requesting different portions of data from a server without requiring separately developed and maintained functions on the server side for retrieving each portion of data, and without requiring an inefficient return of all portions of data, including portions not requested by the client.

DETAILED DESCRIPTION OF THE INVENTION

The present invention provides a technique for a client to specify an instruction for invoking a web service provider's function to retrieve data and a definition of a format to structure the retrieved data. The specified instruction and format definition are included in a web service invocation sent from the client to the web service provider. The web service provider invokes the function and returns the data to the client in the specified format.

Figure 1:
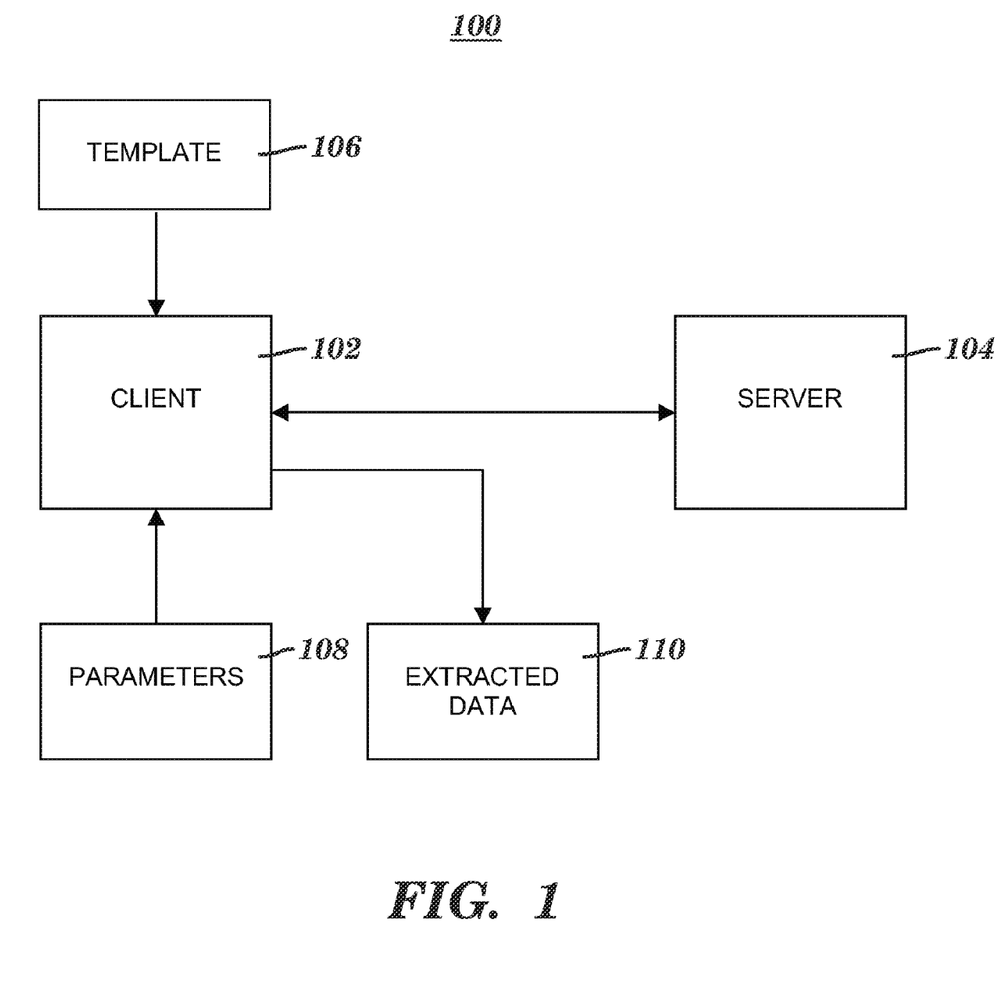
FIG. 1 is a block diagram of a system for dynamically specifying a format for data provided by a web service invocation, in accordance with embodiments of the present invention.

FIG. 1 is a block diagram of a system for dynamically specifying a format for data provided by a web service invocation, in accordance with embodiments of the present invention. System 100 includes a client computing unit 102 communicating with a server computing unit 104 over a network (not shown), such as the Internet. In one embodiment, server computing unit 104 provides a web service. As used herein, a web service is defined as a software system designed to support interoperable machine-to-machine interaction over a network. A web service has an interface described in a machine-processable format (e.g., Web Services Description Language (WSDL)). Software applications written in various programming languages and running on various platforms can use web services to exchange data over computer networks (e.g., the Internet) in a manner similar to inter-process communication on a single computer.

Client 102 uses messages to interact with server 104 in a manner prescribed by the web service's interface. In one embodiment, messages exchanged between client 102 and server 104 are implemented by SOAP messages (i.e., each message is enclosed in a SOAP envelope). SOAP is a lightweight protocol based on extensible markup language (XML) for exchanging information in a decentralized, distributed computing environment. SOAP messages are conveyed using Hypertext Transfer Protocol (HTTP) and are used to query and return information and invoke services across the Internet.

An executable template script 106 and one or more parameters 108 are input into client 102. Executable template script 106 is also referred to herein simply as a template or a template script. Template 106 is included in a request sent from client 102 to server 104, where the request is a request for a data item residing on server 104. In one embodiment, the request is a SOAP message that requests that a data item residing on server 104 be returned to client 102. Template 106 includes (1) an instruction for invoking a function that resides on server 104 and (2) a definition that specifies a format to structure the data item. The one or more parameters 108 are to be passed to the function residing on server 104. Hereinafter, the function residing on server 104 is also referred to as the function specified by template 106.

Following the processing described below relative to FIG. 2, a result of the processing is generated by server 104 and sent from server 104 to client 102. Client 102 processes the result to generate extracted data 110. Extracted data 110 is the requested data item extracted from the result. The processing of the result by client 102 to generate extracted data 110 is described below relative to FIG. 2.

Figure 2:
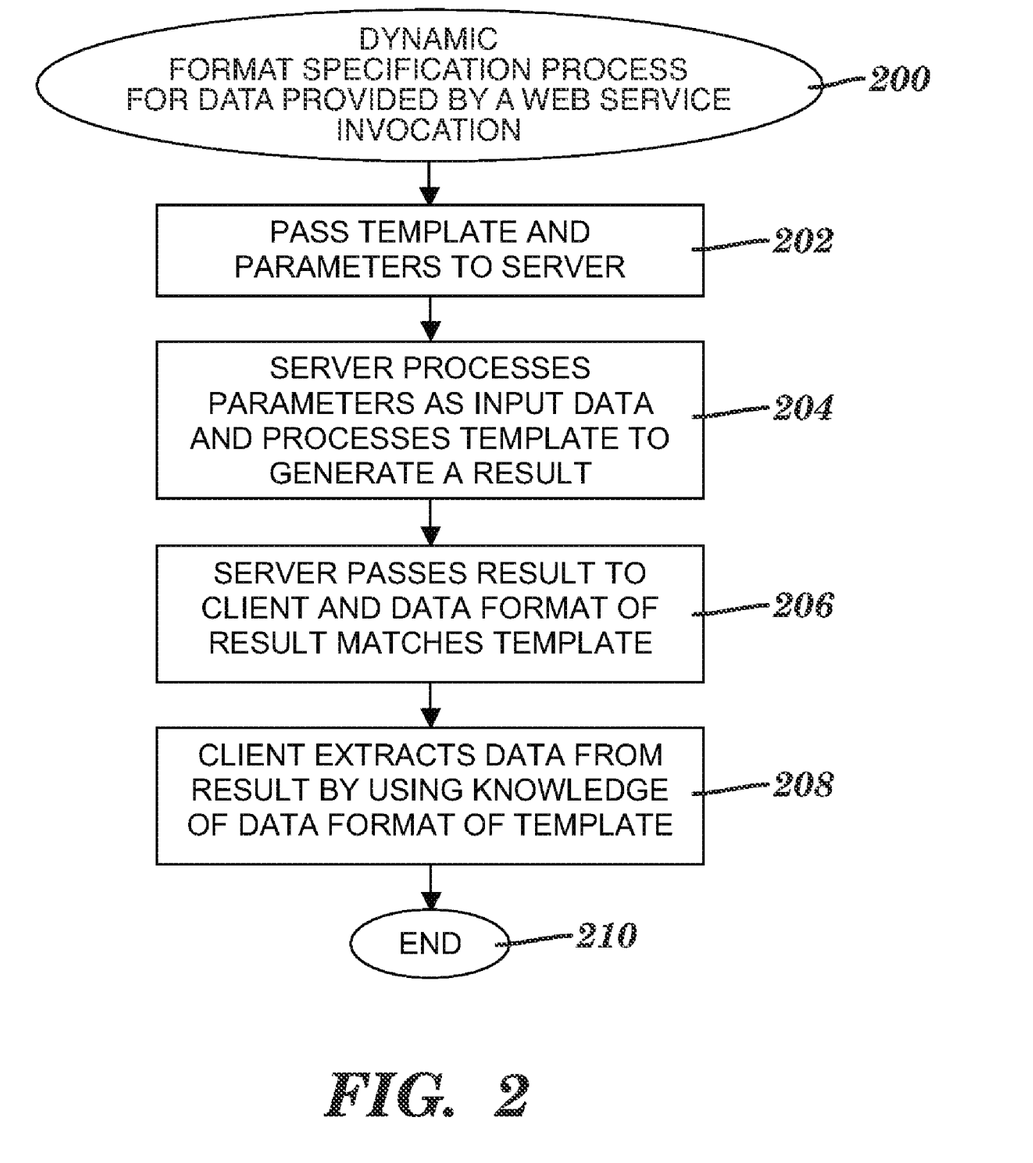
FIG. 2 is a flow chart of a process for dynamically specifying a format for data provided by a web service invocation, in accordance with embodiments of the present invention.

FIG. 2 is a flow chart of a process for dynamically specifying a format for data provided by a web service invocation, in accordance with embodiments of the present invention. The dynamic format specification process for data provided by a web service invocation starts at step 200. In step 202, client 102 (see FIG. 1) sends a request for a data item to server 104 (see FIG. 1). The sending of the request passes (i.e., sends) template 106 (see FIG. 1) and one or more parameters 108 (see FIG. 1) to server 104 (see FIG. 1). The template and the one or more parameters are included in the request. In one embodiment, the function specified by template 106 (see FIG. 1) requires no parameter values as input data to the function or to control actions to be performed by the function. If the function specified by the template requires no parameter values, then step 202 includes sending the template to the server, but does not include sending the one or more parameters.

In one embodiment, template 106 (see FIG. 1) and one or more parameters 108 (see FIG. 1) are passed in step 202 via a SOAP message sent from client 102 (see FIG. 1) to server 106 (see FIG. 1). The SOAP message includes a SOAP attachment, which includes template 106 (see FIG. 1) and one or more parameters 108 (see FIG. 1).

In step 204, server 104 (see FIG. 1) receives the request for the data item. Prior to receiving the request in step 204, the server does not associate a request for the data item with the format specified by the definition included in template 106 (see FIG. 1). That is, the present invention avoids the need for a predefined agreement between the client and server regarding the format of a data item sent by a server in response to a client request.

In step 204, the server processes one or more parameters 108 (see FIG. 1) received from the client as input data to the function specified by template 106 (see FIG. 1). The processing of each parameter includes a determination by the server whether to associate the parameter with a formal argument of the function specified by the template or to provide the parameter as input that controls one or more actions performed by the function. The server's processing of the one or more parameters indirectly determines a result (see step 204) that is to be generated and sent to the client.

In step 204, server 104 (see FIG. 1) executes (i.e., processes) executable template script 106 (see FIG. 1). The execution of the template script includes performing the instruction included in the template script and invoking the function specified by the template script in response to the performance of the instruction. Further, the execution of the template script includes retrieving the requested data item in response to invoking the function. The data item retrieval is followed by generating a result to be sent to client 102 (see FIG. 1). Server 104 (see FIG. 1) performs the aforementioned steps of performing the instruction, invoking of the function, retrieving the requested data item, and generating the result. The result generated by the server is a formatted data item. The formatted data item is a formatted version of the requested data item. The generation of the formatted version by the server is based on the definition that specifies the format (i.e., the format definition). To use the format definition as a basis for the generation of the formatted data item, the server accesses the format definition via the template script received by the server in step 204.

In one embodiment, server 104 (see FIG. 1) generates a SOAP message that includes the formatted data item generated in step 204. For example, the formatted data item generated in step 204 is included in the body of the SOAP message generated by the server.

In step 206, server 104 (see FIG. 1) passes (i.e., sends) the result generated in step 204 to client 102 (see FIG. 1). In the embodiment in which the server generates a SOAP message whose body includes the formatted data item generated in step 204, the SOAP message generated by the server is sent to the client in step 206. The format of the result matches the format specified by the definition included in template 106 (see FIG. 1). For example, if the format definition in the template specifies that the retrieved data item is to be placed between the tags <result> and </result> (i.e., the format is <result>data item</result>), then the result generated in step 204 is structured by the same format and takes the form: <result>data item</result>.

In step 208, client 102 (see FIG. 1) receives and processes the result sent in step 206. The client extracts the data item requested in step 202 from the result sent in step 206. The extraction of the requested data item utilizes the client's knowledge of the format specified by the definition included in template 106 (see FIG. 1). That is, the extraction of the data item employs logic that resides in client 102 (see FIG. 1), where the logic indicates the format specified by the definition included in the template.

In one embodiment, the logic employed by the extraction in step 208 includes an XML configuration file that includes an XPath expression. The XPath expression indicates that the SOAP message generated and sent by the server in step 206 includes the requested data item between an XML start tag and an XML end tag. The XPath expression includes an identifier (e.g., a string value) that specifies the XML start tag and the XML end tag. As a first example, the XPath expression includes the identifier "result" that specifies the XML start tag <result> and the XML end tag </result>. In this first example, the format specified by the definition included in the template is indicated by the data item being all the data between the XML start tag and the XML end tag. Employing knowledge of the format as indicated by the XPath expression, the client scans the body of the SOAP message to find the XML start and end tags identified by the XPath expression and extracts the item (i.e., all the data) located between the start and end tags. This extracted item is the requested data item. As a second example, the XPath expression indicates that the client is to extract a portion of all the data located between the start and end tags and the extracted portion is the requested data item. In this second example, the format specified by the template is indicated by the data item being a portion of all the data located between the start and end tags.

In one embodiment, the requested data item is included in a plurality of data items capable of being sent by server 104 (see FIG. 1) to client 102 (see FIG. 1). No data item of the plurality of data items other than the requested data item is sent by the server in response to the server receiving the request for the data item in step 204. For example, a data item of a plurality of data items is sent in step 206 in a SOAP message that includes the data item between an XML start tag and an XML end tag. The present invention precisely retrieves and sends the single data item requested in response to the server receiving a request for the data item, thereby advantageously avoiding the inefficient sending of multiple data items that the client has not requested and the additional client-side burden of scanning through multiple data items to detect the requested data item.

The template sent in step 202 and processed by the other steps of FIG. 2 can be dynamically modified and the steps in the process of FIG. 2 can be repeated with the modified template without requiring any change to logic residing on server 104 (see FIG. 1). For example, the template can be modified by changing the definition included in the template to another definition that specifies another format. As another example, the instruction included in the template can be changed so that another function is invoked, thereby retrieving another data item. In either case, the process of FIG. 2 is performed with the modified template without requiring a change to the server-side logic that executes the modified template. In one embodiment, the dynamic modification of the template is completed in a configuration definition file first, which in turn requires a change to a template included in a SOAP attachment sent to the server.

EXAMPLES

The following example specifies a format for a temperature measurement being requested by client 102 (see FIG. 1) via a request sent to server 104 (see FIG. 1) in step 202. The temperature requested is the temperature associated with a specific zip code. The dynamic format specification process for the temperature measurement example is configured by, for instance, the XML configuration definition file (a.k.a. configuration file or configuration definition), presented below (i.e., the file named "remote-definition-test"). This example of a configuration definition instructs the service provider to invoke the temperatureModule.getTemp function with the parameter named zipcode and return the retrieved temperature measurement in between the tags <result> and </result>. The XPath expression that specifies how the client is to extract the data item from the formatted data item in step 208 is the line that starts with <xpath-result id="result". Although only one definition is shown in the configuration file presented below, an application running the dynamic format specification process is capable of supporting multiple configuration definitions, where each definition specifies a unique set comprising a function to be invoked, one or more parameters for the function, and a data format for the data item retrieved by the function and sent to the client. In the case of multiple configuration definitions, each unique set of information specified by a definition supports a unique web service invocation.

```
<service id="remote-definition-test">
    <!-- Create SOAP message with the zipcode passed from a Java
application -->
    <soap endpoint="
http://localhost:9080/web/services/RemoteDefinitionPort">
        <![CDATA[
            <zipcode>${input[0]}</zipcode>
        ]]>
    </soap>
    <!-- Create template which remotely invokes functions on the
service provider and defines the data format for the return
message -->
    <soap-attachment id="_template" mime-type="text/plain">
        <![CDATA[
            #set( $zipcode =
$_soapdom.selectSingleNode('//zipcode').text )
            <result>$temperatureModule.getTemp( $zipcode)</result>
        ]]>
    </soap-attachment>
    <!-- Select data from the returned SOAP message -->
    <xpath-result id="result" select="//result" return="single"/>
    <!-- Make result available to the Java application -->
    <return-value>${result}</return-value>
</service>
```

An example of a SOAP message sent to the server in step 202 is shown below. This SOAP message is associated with the remote-definition-test configuration definition file presented above. The SOAP message includes a specific value (i.e., 27613) for the zipcode parameter.

```
<soap:Envelope xmlns:soap="
http://schemas.xmlsoap.org/soap/envelope/" xmlns:xsi="
http://www.w3.org/2001/XMLSchema-instance" xmlns:xsd="
http://www.w3.org/2001/XMLSchema">
    <soap:Body>
        <zipcode>27613</zipcode>
    </soap:Body>
</soap:Envelope>
```

An example of a SOAP attachment is presented below. This sample attachment is attached to the sample SOAP message shown above. This attachment includes (1) an instruction to assign the specific zipcode value included the SOAP message body to the zipcode parameter (see the first line of the sample attachment), and (2) the executable template script that specifies the instruction to be performed to invoke the temperatureModule.getTemp function and the format to be used for the formatted data item sent to client 102 (see FIG. 1) in step 206 (see the second line of the sample attachment).

```
#set( $zipcode = $_soapdom.selectSingleNode('//zipcode').text )
<result>$temperatureModule.getTemp( $zipcode)</result>
```

In step 204, server 104 (see FIG. 1) processes this attachment to assign the value of 27613 in the SOAP message body to the zipcode parameter, and to execute the template script. The execution of the template script invokes the temperatureModule.getTemp function with 27613 associated with the function's formal argument. The step 204 invocation of the temperatureModule.getTemp function retrieves a temperature measurement (i.e., 71) associated with the 27613 zip code and places the retrieved temperature between the tags <result> and </result>. The sample SOAP message below includes the formatted data item generated by server 104 (see FIG. 1) in step 204 (i.e., <result>71</result>) and is an example of the message sent by server 104 (see FIG. 1) to client 102 (see FIG. 1) in step 206. In step 208, client 102 (see FIG. 1) extracts finds the formatted data item in the SOAP message body and extracts 71 as the requested data item, which indicates a temperature of 71 degrees associated with the zip code 27613.

```
<soap:Envelope xmlns:soap="
http://schemas.xmlsoap.org/soap/envelope/" xmlns:xsi="
http://www.w3.org/2001/XMLSchema-instance" xmlns:xsd="
http://www.w3.org/2001 /XMLSchema">
    <soap: Body>
        <result>71</result>
    </soap:Body>
</soap:Envelope>
```

Computing System

Figure 3:
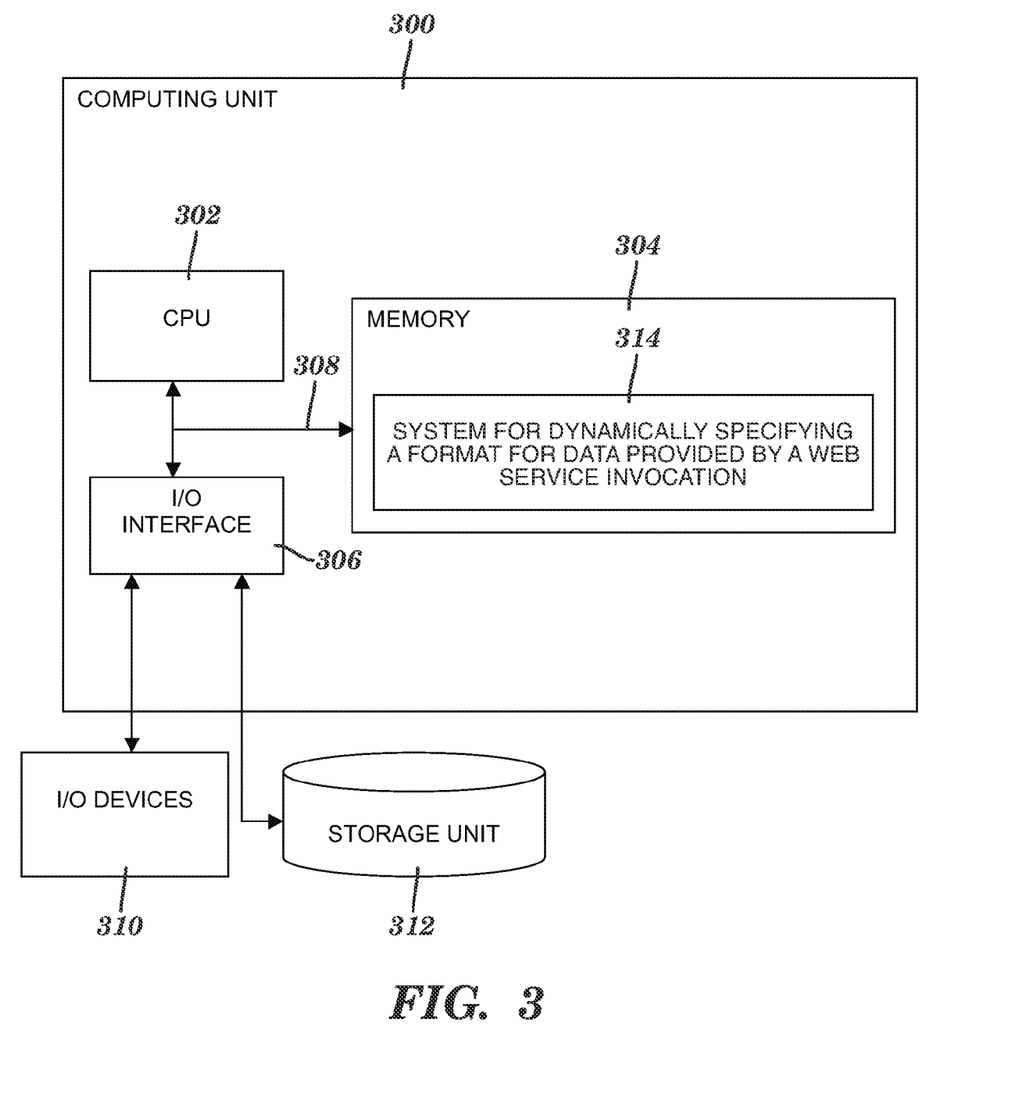
FIG. 3 is a block diagram of a computing unit for implementing the process of FIG. 2, in accordance with embodiments of the present invention.

FIG. 3 is a block diagram of a computing unit for implementing the process of FIG. 2, in accordance with embodiments of the present invention. Computing unit 300 generally comprises a central processing unit (CPU) 302, a memory 304, an input/output (I/O) interface 306, a bus 308, I/O devices 310 and a storage unit 312. CPU 302 performs computation and control functions of computing unit 300. CPU 302 may comprise a single processing unit, or be distributed across one or more processing units in one or more locations (e.g., on a client and server).

Memory 304 may comprise any known type of data storage and/or transmission media, including bulk storage, magnetic media, optical media, random access memory (RAM), read-only memory (ROM), a data cache, a data object, etc. Cache memory elements of memory 304 provide temporary storage of at least some program code in order to reduce the number of times code must be retrieved from bulk storage during execution. Storage unit 312 is, for example, a magnetic disk drive or an optical disk drive that stores data. Moreover, similar to CPU 302, memory 304 may reside at a single physical location, comprising one or more types of data storage, or be distributed across a plurality of physical systems in various forms. Further, memory 304 can include data distributed across, for example, a LAN, WAN or storage area network (SAN) (not shown).

I/O interface 306 comprises any system for exchanging information to or from an external source. I/O devices 310 comprise any known type of external device, including a display monitor, keyboard, mouse, printer, speakers, handheld device, printer, facsimile, etc. Bus 308 provides a communication link between each of the components in computing unit 300, and may comprise any type of transmission link, including electrical, optical, wireless, etc.

I/O interface 306 also allows computing unit 300 to store and retrieve information (e.g., program instructions or data) from an auxiliary storage device (e.g., storage unit 312). The auxiliary storage device may be a non-volatile storage device (e.g., a CD-ROM drive which receives a CD-ROM disk). Computing unit 300 can store and retrieve information from other auxiliary storage devices (not shown), which can include a direct access storage device (DASD) (e.g., hard disk or floppy diskette), a magneto-optical disk drive, a tape drive, or a wireless communication device.

Memory 304 includes a system for dynamically specifying a format for data provided by a web service invocation 314 (hereinafter referred to as the format specification system), which implements the process of FIG. 2. Further, memory 304 may include other systems not shown in FIG. 3, such as an operating system (e.g., Linux) that runs on CPU 302 and provides control of various components within and/or connected to computing unit 300.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of format specification system 314 for use by or in connection with a computing unit 300 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 304, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the dynamic format specification process of the present invention. Thus, the present invention discloses a process for supporting computer infrastructure, comprising integrating, hosting, maintaining and deploying computer-readable code into a computing system (e.g., computing unit 300), wherein the code in combination with the computing system is capable of performing a method of dynamically specifying a format for data provided by a web service invocation.

In another embodiment, the invention provides a business method that performs the process steps of the invention on a subscription, advertising and/or fee basis. That is, a service provider, such as a Solution Integrator, can offer to create, maintain, support, etc. an array value substitution method of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of dynamically specifying formats for data provided by web service invocations in a networked computing environment, comprising:

a first computing unit receiving, via a network, a first request from a second computing unit for a first data item residing on said first computing unit, said first computing unit providing a web service, said first request being an invocation of said web service, wherein said first request includes an executable template script, wherein said executable template script includes a first definition specifying a first format that structures said first data item as a formatted data item for receipt by said second computing unit as a result of said first request, and wherein said executable template script further includes a first instruction for invoking a function residing in said first computing unit to retrieve said first data item residing on said first computing unit;

said first computing unit receiving said executable template script within said first request;

a processor of said first computing unit executing said executable template script using logic residing in said first computing unit, said executing said executable template script comprising: invoking said function a first time by performing said first instruction included in said executable template script, retrieving said first data item in response to said invoking said function said first time, and generating said formatted data item structured by said first format specified by said first definition;

said first computing unit sending said formatted data item to said second computing unit;

said first computing unit receiving a second request from another computing unit for said first data item residing on said first computing unit, said second request being another invocation of said web service;

within said second request, said first computing unit receiving a modification of said executable template script that includes said instruction for invoking said function and further includes a second definition instead of said first definition, wherein said second definition specifies a second format that is different from said first format and that structures said first data item as a second formatted data item that is different from said first formatted data item;

said first computing unit executing said modification of said executable template script by invoking said function a second time by performing said first instruction included in said modification of said executable template script, retrieving said first data item in response to said invoking said function said second time, and generating said second formatted data item structured by said second format specified by said second definition, wherein said executing said modification of said executable template script that includes said generating said second formatted data item structured by said second format specified by said second definition uses said logic residing in said first computing unit that was also used to perform said executing said executable template script that includes said generating said formatted data item structured by said first format specified by said first definition, wherein said executing said executable template script does not require an agreement between said first computing unit and said second computing unit about said first format structuring said formatted data item, and wherein said executing said modification of said executable template script does not require an agreement between said first computing unit and said another computing unit about said second format structuring said second formatted data item; and subsequent to said executing said modification of said executable template script, said first computing unit sending said second formatted data item to said another computing unit, wherein said second formatted data item is said first data item structured in said second format.

2. The method of claim 1, further comprising:
within said first request, said first computing unit receiving a parameter from said second computing unit, wherein said invoking said function said first time includes passing said parameter to said function to associate said parameter with a formal argument of said function or to control an action performed by said function.

3. The method of claim 1, wherein said receiving said first request includes receiving a SOAP message that includes a SOAP attachment, wherein said SOAP attachment specifies said first instruction whose performance invokes said function and further specifies said first format as being said first data item between an extensible markup language (XML) start tag and an XML end tag, and wherein said executing said executable template script is based on said SOAP attachment.

4. The method of claim 1, wherein said first data item is included in a plurality of data items capable of being sent by said first computing unit to said second computing unit, and wherein no data item of said plurality of data items other than said first data item is sent by said first computing unit in response to said receiving said first request.

5. The method of claim 1, wherein said first computing unit does not associate said first format with said first request prior to said receiving said first request.

6. The method of claim 1, further comprising:
said first computing unit receiving a third request from said second computing unit for a second data item residing on said first computing unit, said third request being yet another invocation of said web service;
within said third request, said first computing unit receiving a second modification of said executable template script that includes a second instruction instead of said first instruction, wherein said second instruction invokes a second function residing in said first computing unit to retrieve said second data item residing on said first computing unit, and wherein said second modification of said executable template script further includes said first definition that specifies said first format that further structures said second data item as a formatted second data item for receipt by said second computing unit as a result of said third request;
said first computing unit executing said second modification of said executable template script, said executing said second modification comprising: invoking said second function by performing said second instruction, retrieving said second data item in response to said invoking said second function, and generating said formatted second data item structured by said first format specified by said first definition, wherein said executing said second modification of said executable template script does not require any logic other than said logic residing in said first computing unit that was used to perform said executing said executable template script to generate said formatted data item structured by said first format; and
subsequent to said executing said second modification of said executable template script, said first computing unit sending said formatted second data item to said second computing unit, wherein said formatted second data item is said second data item structured in said first format.

7. The method of claim 1, further comprising: providing at least one support service for at least one of creating, integrating, hosting, maintaining, and deploying computer-readable code in said first computing system comprising a processor, wherein the processor carries out instructions contained in the code causing the first computing system to perform said receiving said first request for said first data item, said receiving said executable template script within said first request, said executing said executable template script, said sending said formatted data item, said receiving said second request for said first data item, said receiving said modification of said executable template script within said second request, said executing said modification of said executable template script, and said sending said second formatted data item.

8. The method of claim 1, further comprising:
said first computing unit receiving a third request from another computing unit for a second data item residing on said first computing unit, said third request being yet another invocation of said web service;
within said third request, said first computing unit receiving a second modification of said executable template script that includes a second instruction instead of said first instruction, wherein said second instruction invokes a second function residing in said first computing unit to retrieve said second data item residing on said first computing unit, wherein said second modification of said executable template script further includes said second definition instead of said first definition, said second definition specifying said second format that structures said second data item as a formatted second data item for receipt by said another computing unit as a result of said third request;

said first computing unit executing said second modification of said executable template script, said executing said second modification comprising: invoking said second function by performing said second instruction, retrieving said second data item in response to said invoking said second function, and generating said formatted second data item structured by said second format specified by said second definition, wherein said executing said second modification of said executable template script does not require any logic other than said logic residing in said first computing unit that was used to perform said executing said executable template script to generate said formatted data item structured by said first format; and subsequent to said executing said second modification of said executable template script, said first computing unit sending said formatted second data item to said another computing unit, wherein said formatted second data item is said second data item structured in said second format.

9. A computer system comprising a first computing unit including: a processor; and a computer-readable memory unit coupled to said processor, said memory unit containing instructions executable by said processor to implement a method of dynamically specifying a formats for data provided by web service invocations in a networked computing environment, said method comprising:

said first computing unit receiving, via a network, a first request from a second computing unit for a first data item residing on said first computing unit, said first computing unit providing a web service, said first request being an invocation of said web service, wherein said first request includes an executable template script, wherein said executable template script includes a first definition specifying a first format that structures said first data item as a formatted data item for receipt by said second computing unit as a result of said first request, and wherein said executable template script further includes a first instruction for invoking a function residing in said first computing unit to retrieve said first data item residing on said first computing unit;

said first computing unit receiving said executable template script within said first request;

said first computing unit executing said executable template script using logic residing in said first computing unit, said executing said executable template script comprising: invoking said function a first time by performing said first instruction included in said executable template script, retrieving said first data item in response to said invoking said function said first time, and generating said formatted data item structured by said first format specified by said first definition;

said first computing unit sending said formatted data item to said second computing unit;

said first computing unit receiving a second request from another computing unit for said first data item residing on said first computing unit, said second request being another invocation of said web service;

within said second request, said first computing unit receiving a modification of said executable template script that includes said instruction for invoking said function and further includes a second definition instead of said first definition, wherein said second definition specifies a second format that is different from said first format and that structures said first data item as a second formatted data item that is different from said first formatted data item;

said first computing unit executing said modification of said executable template script by invoking said function a second time by performing said first instruction included in said modification of said executable template script, retrieving said first data item in response to said invoking said function said second time, and generating said second formatted data item structured by said second format specified by said second definition, wherein said executing said modification of said executable template script that includes said generating said second formatted data item structured by said second format specified by said second definition uses said logic residing in said first computing unit that was also used to perform said executing said executable template script that includes said generating said formatted data item structured by said first format specified by said first definition, wherein said executing said executable template script does not require an agreement between said first computing unit and said second computing unit about said first format structuring said formatted data item, and wherein said executing said modification of said executable template script does not require an agreement between said first computing unit and said another computing unit about said second format structuring said second formatted data item; and subsequent to said executing said modification of said executable template script, said first computing unit sending said second formatted data item to said another computing unit, wherein said second formatted data item is said first data item structured in said second format.

10. The system of claim 9, wherein said method further comprises:

within said first request, said first computing unit receiving a parameter from said second computing unit, wherein said invoking said function said first time includes passing said parameter to said function to associate said parameter with a formal argument of said function or to control an action performed by said function.

11. The system of claim 9, wherein said receiving said first request includes receiving a SOAP message that includes a SOAP attachment, wherein said SOAP attachment specifies said first instruction whose performance invokes said function and further specifies said first format as being said first data item between an extensible markup language (XML) start tag and an XML end tag, and wherein said executing said executable template script is based on said SOAP attachment.

12. The system of claim 9, wherein said first data item is included in a plurality of data items capable of being sent by said first computing unit to said second computing unit, and wherein no data item of said plurality of data items other than said first data item is sent by said first computing unit in response to said receiving said first request.

13. The system of claim 9, wherein said first computing unit does not associate said first format with said first request prior to said receiving said first request.

14. The system of claim 9, wherein said method further comprises:
    said first computing unit receiving a third request from said second computing unit for a second data item residing on said first computing unit, said third request being yet another invocation of said web service;
    within said third request, said first computing unit receiving a second modification of said executable template script that includes a second instruction instead of said first instruction, wherein said second instruction invokes a second function residing in said first computing unit to retrieve said second data item residing on said first computing unit, and wherein said second modification of said executable template script further includes said first definition that specifies said first format that further structures said second data item as a formatted second data item for receipt by said second computing unit as a result of said third request;
    said first computing unit executing said second modification of said executable template script, said executing said second modification comprising: invoking said second function by performing said second instruction, retrieving said second data item in response to said invoking said second function, and generating said formatted second data item structured by said first format specified by said first definition, wherein said executing said second modification of said executable template script does not require any logic other than said logic residing in said first computing unit that was used to perform said executing said executable template script to generate said formatted data item structured by said first format; and
    subsequent to said executing said second modification of said executable template script, said first computing unit sending said formatted second data item to said second computing unit, wherein said formatted second data item is said second data item structured in said first format.

15. The computer system of claim 9, wherein said method further comprises:
    said first computing unit receiving a third request from another computing unit for a second data item residing on said first computing unit, said third request being yet another invocation of said web service;
    within said third request, said first computing unit receiving a second modification of said executable template script that includes a second instruction instead of said first instruction, wherein said second instruction invokes a second function residing in said first computing unit to retrieve said second data item residing on said first computing unit, wherein said second modification of said executable template script further includes said second definition instead of said first definition, said second definition specifying said second format that structures said second data item as a formatted second data item for receipt by said another computing unit as a result of said third request;
    said first computing unit executing said second modification of said executable template script, said executing said second modification comprising: invoking said second function by performing said second instruction, retrieving said second data item in response to said invoking said second function, and generating said formatted second data item structured by said second format specified by said second definition, wherein said executing said second modification of said executable template script does not require any logic other than said logic residing in said first computing unit that was used to perform said executing said executable template script to generate said formatted data item structured by said first format; and
    subsequent to said executing said second modification of said executable template script, said first computing unit sending said formatted second data item to said another computing unit, wherein said formatted second data item is said second data item structured in said second format.

16. A computer program product comprising a computer readable storage device having a computer readable program code stored therein, said computer readable program code containing instructions that are carried out by a processor of a first computing unit to implement a method of dynamically specifying formats for data provided by web service invocations in a networked computing environment, said method comprising:
    said first computing unit receiving, via a network, a first request from a second computing unit for a first data item residing on said first computing unit, said first computing unit providing a web service, said first request being an invocation of said web service, wherein said first request includes an executable template script, wherein said executable template script includes a first definition specifying a first format that structures said first data item as a formatted data item for receipt by said second computing unit as a result of said first request, and wherein said executable template script further includes a first instruction for invoking a function residing in said first computing unit to retrieve said first data item residing on said first computing unit;
    said first computing unit receiving said executable template script within said first request;
    said first computing unit executing said executable template script using logic residing in said first computing unit, said executing said executable template script comprising: invoking said function a first time by performing said first instruction included in said executable template script, retrieving said first data item in response to said invoking said function said first time, and generating said formatted data item structured by said first format specified by said first definition;
    said first computing unit sending said formatted data item to said second computing unit;
    said first computing unit receiving a second request from another computing unit for said first data item residing on said first computing unit, said second request being another invocation of said web service;
    within said second request, said first computing unit receiving a modification of said executable template script that includes said instruction for invoking said function and further includes a second definition instead of said first definition, wherein said second definition specifies a second format that is different from said first format and that structures said first data item as a second formatted data item that is different from said first formatted data item;
    said first computing unit executing said modification of said executable template script by invoking said function a second time by performing said first instruction included in said modification of said executable template script, retrieving said first data item in response to said invoking said function said second time, and generating said second formatted data item structured by said second format specified by said second definition, wherein said executing said modification of said executable template script that includes said generating said second formatted data item structured by said second format specified by said second definition uses said logic residing in said first computing unit that was also used to perform said executing said executable template script that includes said generating said formatted data item structured by said first format specified by said first definition, wherein said executing said executable template script does not require an agreement between said first computing unit and said second computing unit about said first format structuring said formatted data item, and wherein said executing said modification of said executable template script does not require an agreement between said first computing unit and said another computing unit about said second format structuring said second formatted data item; and subsequent to said executing said modification of said executable template script, said first computing unit sending said second formatted data item to said another computing unit, wherein said second formatted data item is said first data item structured in said second format.

17. The program product of claim 16, wherein said method further comprises:
within said first request, said first computing unit receiving a parameter from said second computing unit, wherein said invoking said function said first time includes passing said parameter to said function to associate said parameter with a formal argument of said function or to control an action performed by said function.

18. The program product of claim 16, wherein said receiving said first request includes receiving a SOAP message that includes a SOAP attachment, wherein said SOAP attachment specifies said first instruction whose performance invokes said function and further specifies said first format as being said first data item between an extensible markup language (XML) start tag and an XML end tag, and wherein said executing said executable template script is based on said SOAP attachment.

19. The program product of claim 16, wherein said first data item is included in a plurality of data items capable of being sent by said first computing unit to said second computing unit, and wherein no data item of said plurality of data items other than said first data item is sent by said first computing unit in response to said receiving said first request.

20. The program product of claim 16, wherein said first computing unit does not associate said first format with said first request prior to said receiving said first request.

21. The program product of claim 16, wherein said method further comprises:
said first computing unit receiving a third request from said second computing unit for a second data item residing on said first computing unit, said third request being yet another invocation of said web service;
within said third request, said first computing unit receiving a second modification of said executable template script that includes a second instruction instead of said first instruction, wherein said second instruction invokes a second function residing in said first computing unit to retrieve said second data item residing on said first computing unit, and wherein said second modification of said executable template script further includes said first definition that specifies said first format that further structures said second data item as a formatted second data item for receipt by said second computing unit as a result of said third request;
said first computing unit executing said second modification of said executable template script, said executing said second modification comprising: invoking said second function by performing said second instruction, retrieving said second data item in response to said invoking said second function, and generating said formatted second data item structured by said first format specified by said first definition, wherein said executing said second modification of said executable template script does not require any logic other than said logic residing in said first computing unit that was used to perform said executing said executable template script to generate said formatted data item structured by said first format; and
subsequent to said executing said second modification of said executable template script, said first computing unit sending said formatted second data item to said second computing unit, wherein said formatted second data item is said second data item structured in said first format.

22. The program product of claim 16, wherein said method further comprises:
said first computing unit receiving a third request from another computing unit for a second data item residing on said first computing unit, said third request being yet another invocation of said web service;
within said third request, said first computing unit receiving a second modification of said executable template script that includes a second instruction instead of said first instruction, wherein said second instruction invokes a second function residing in said first computing unit to retrieve said second data item residing on said first computing unit, wherein said second modification of said executable template script further includes said second definition instead of said first definition, said second definition specifying said second format that structures said second data item as a formatted second data item for receipt by said another computing unit as a result of said third request;
said first computing unit executing said second modification of said executable template script, said executing said second modification comprising: invoking said second function by performing said second instruction, retrieving said second data item in response to said invoking said second function, and generating said formatted second data item structured by said second format specified by said second definition, wherein said executing said second modification of said executable template script does not require any logic other than said logic residing in said first computing unit that was used to perform said executing said executable template script to generate said formatted data item structured by said first format; and
subsequent to said executing said second modification of said executable template script, said first computing unit sending said formatted second data item to said another computing unit, wherein said formatted second data item is said second data item structured in said second format.

23. A method of dynamically specifying a format for data provided by a web service invocation in a networked computing environment, comprising:

receiving, by a first computing unit via a network, a request from a second computing unit for a first data item residing on said first computing unit, said first computing unit providing a web service, said request being an invocation of said web service, wherein said request includes an executable template script, wherein said executable template script includes a definition specifying a first format that structures said first data item as a formatted data item for receipt by said second computing unit as a result of said request, and wherein said executable template script further includes an instruction for invoking a function residing in said first computing unit to retrieve said first data item residing on said first computing unit;

receiving, by said first computing unit and within said request, said executable template script;

executing, by a processor of said first computing unit, said executable template script, said executing comprising: invoking said function by performing said instruction, retrieving said first data item in response to said invoking, and generating said formatted data item structured by said first format specified by said definition;

sending, by said first computing unit, said formatted data item to said second computing unit;

generating, by said first computing unit, a SOAP message including said formatted data item, wherein said sending said formatted data item includes sending, by said first computing unit, said SOAP message to said second computing unit, wherein said sending said SOAP message facilitates an extraction of said first data item from said formatted data item by said second computing unit, wherein said extraction utilizes logic residing on said second computing unit, said logic indicating said first format specified by said definition included in said executable template script, wherein said logic includes an XPath expression that indicates that said SOAP message includes said first data item, an XML start tag and an XML end tag, said first data item included in said SOAP message being one of: all data between said XML start tag and said XML end tag and a portion of said all data between said XML start tag and said XML end tag, wherein said XPath expression includes an identifier that specifies said XML start tag and said XML end tag, and wherein said first data item being one of said all data between said XML start tag and said XML end tag and said portion of said all data indicates said first format.

\* \* \* \* \*